May 19, 1964
H. O. CORBETT
3,133,313
EXTRUSION DIE MECHANISM
Filed Oct. 30, 1962
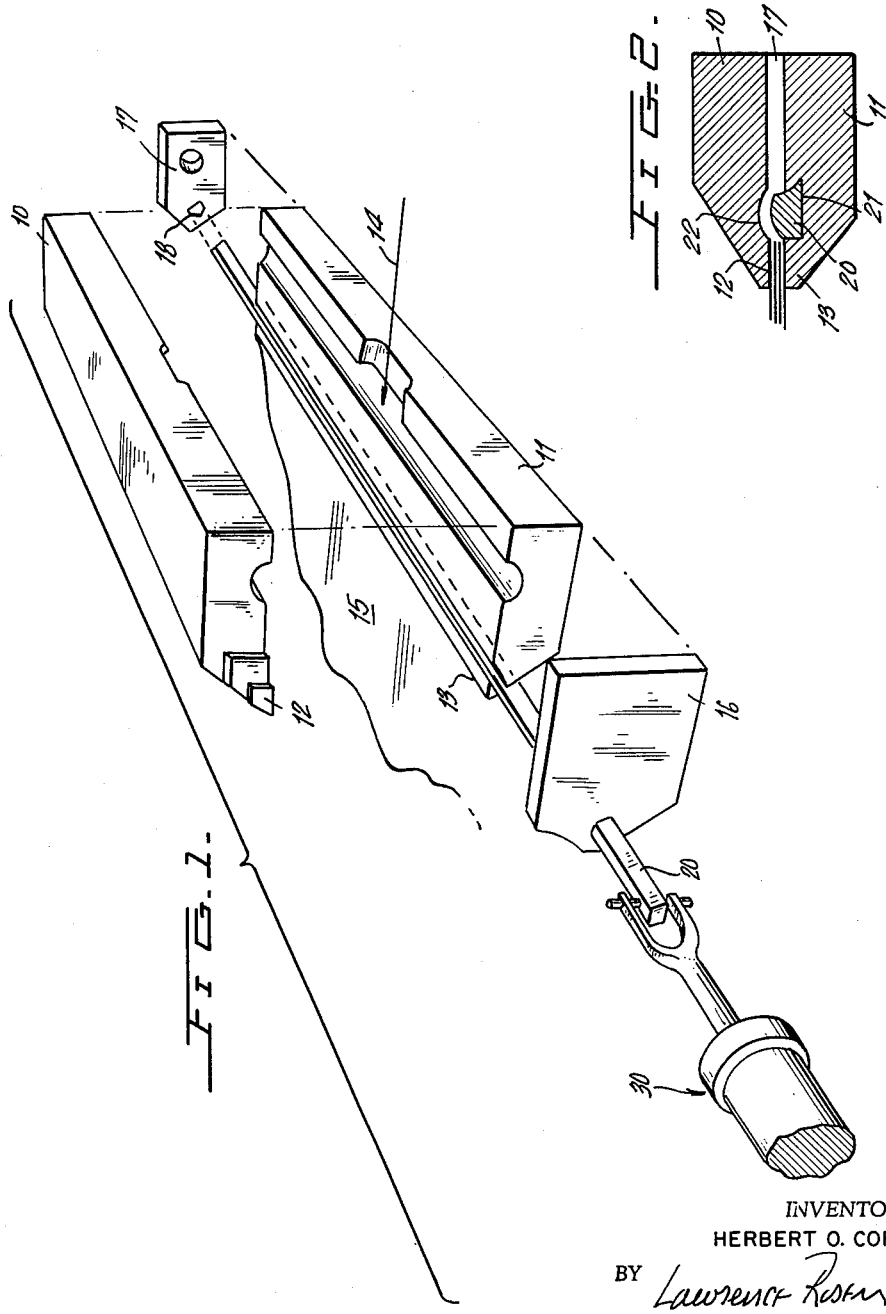
INVENTOR.
HERBERT O. CORBETT
BY Lawrence Rosen

United States Patent Office 3,133,313
Patented May 19, 1964

3,133,313
EXTRUSION DIE MECHANISM
Herbert O. Corbett, Canandaigua, N.Y., assignor to National Distillers and Chemical Corporation, New York, N.Y., a corporation of Virginia
Filed Oct. 30, 1962, Ser. No. 234,148
6 Claims. (Cl. 18—12)

This invention relates to an extrusion die mechanism, and more specifically relates to an extrusion die which contains a reciprocating mechanism therein adjacent the output orifice of the die which oscillates the melt flow from the die orifice.

In accordance with the invention, a groove is machined into the lower die body of the die wherein a rod, bar, or the like can be reciprocated or oscillated in a direction transverse to the flow of the melt being extruded through the die lips.

Accordingly, a flow variation is induced at a controlled rate upon the flowing melt so that gauge limits across the final web will fall at random points to result in a smooth appearing, wrinkle-free roll when the material is wound. That is to say, presently extruded flat film will often contain gauge bands or regions of increased thickness due to imperfections in the die and other causes. When the roll of film is wound after its extrusion, the portions of increased gauge fall atop one another to give a poor resulting roll geometry.

By providing the novel oscillating bar within the die, the gauge bands noted above will be randomly moved over the surface of the web being extruded so that the resulting roll will be a smooth, hard roll in which the randomly positioned gauge bands will not fall atop one another.

It will be noted that the novel oscillating mechanism of the invention is extremely simple in construction, and requires that a relatively light mass be moved. This is to be contrasted to other mechanisms which attempt to achieve the end of the present invention by physical oscillation of the entire die structure. Clearly, in such cases, provision must be taken for connecting the high pressure melt from a stationary extruder to a movable die body, and relatively high power oscillating mechanisms are required to move the complete mass of the entire die.

Furthermore, when the entire die structure, or one of the die bodies, is physically oscillated, the web being extruded will be physically displaced so that the edges of the web are not straight and must be cut from the main web body to cause substantial waste.

Accordingly, a primary object of this invention is to improve the roll geometry of rolls of extruded film.

Another object of this invention is to provide a novel die structure for distributing gauge variations across the width of an extruded web.

These and other objects of this invention will become apparent from the following description when taken in connection with the drawings, in which:

FIGURE 1 shows an exploded perspective view of a conventional die for extruding flat film as modified in accordance with the invention.

FIGURE 2 is a cross-sectional view of the die of FIGURE 1 when assembled.

Referring now to the figures, a typical extrusion die is illustrated which comprises an upper die body 10 and lower die body 11 disposed in spaced relationship to define an extrusion chamber therebetween. The upper and lower die bodies 10 and 11 have upper and lower die lips 12 and 13 respectively, whereupon a melt or extrudate such as any desired thermoplastic material supplied from a conventional extruder in the direction of arrow 14 will be extruded from lips 12 and 13, as indicated in FIGURE 1 as a web 15.

The upper and lower die bodies 10 and 11 respectively are normally held in fixed spaced relationship with respect to one another by die end caps 16 and 17 which are secured to die bodies 10 and 11 in any desired and well known manner.

In accordance with the invention, the die end caps are provided with suitable apertures such as aperture 18 shown in cap 17 which receive an elongated bar or rod 20, disposed in substantially parallel relationship with respect to the die orifice and mounted for reciprocatory movement in a direction transverse to the flow of extrudate through the die. The oscillator rod 20 passes through a dove-tail shaped portion 21, as shown in cross-section in FIGURE 2, while the lower surface of the upper die body 10 has an undercut portion 22 which corresponds to the upper shape of oscillator rod 20. The fit between oscillator rod 20, die body 11 and end caps 16 and 17 is such that rod 20 can be easily moved parallel to its axis.

The end of rod 20, as shown in FIGURE 1, is then connected to an appropriate reciprocating mechanism 30 which can be actuated in any desired manner such as by electrical solenoid means or by appropriate hydraulic operating means, whereupon the rod 20 is continually oscillated as the liquid melt which forms web 15 passes over oscillator rod 20. By way of example, the reciprocating or operating mechanism 30 can move the rod 20 for a full excursion of the order of 3 inches at a frequency of the order of 5 cycles per minute. Clearly, the maximum excursion of oscillator rod 20 and frequency of oscillation can be selected within wide limits.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. In a die for extruding a thermoplastic web, an elongated upper die body and an elongated lower die body disposed in spaced relationship and having opposed horizontally disposed faces defining an extrusion chamber therebetween; said upper and lower die bodies having upper and lower die lips, respectively, providing an extrusion orifice; one of said faces being provided with a longitudinally disposed channel; a transversely disposed elongated bar slidably received in said channel for reciprocatory movement; said bar including an extending portion which projects into said extrusion chamber; and operating mechanism for reciprocating said extending portion transversely through the path of extrudate flowing through the extrusion chamber toward said extrusion orifice.

2. A die as set forth in claim 1 where one of said die bodies is provided with a channel for the reception of said elongated bar and said channel and said bar are of dovetail cross-sectional configuration.

3. A die as set forth in claim 1 where the lower die body is provided with a channel in the upper surface thereof for the reception of said elongated bar and said elongated bar is of sufficient height to extend above the upper surface of said lower die body into said extrusion chamber.

4. A die as set forth in claim 3 where the lower surface of said upper die body is provided with a channel located immediately above the extending portion of said elongated bar and having a cross-sectional configuration complementary to the upper surface thereof.

5. A die as set forth in claim 1 where the upper die body is provided with a channel in the lower surface thereof for the reception of said elongated bar and said elongated bar is of sufficient height to depend beneath the lower surface of said upper die body into said extrusion chamber.

6. A die as set forth in claim 5 where the upper surface of said lower die body is provided with a channel located immediately beneath the depending portion of said elongated bar and having a cross-sectional configuration complementary to the upper surface thereof.

References Cited in the file of this patent

UNITED STATES PATENTS

| | | |
|---|---|---|
| 2,365,326 | Bailey | Dec. 19, 1944 |
| 2,813,301 | Underwood | Nov. 19, 1957 |

FOREIGN PATENTS

| | | |
|---|---|---|
| 841,501 | Great Britain | July 13, 1960 |

OTHER REFERENCES

Schenkel, G. P.: Effects of Recent Fundamental Investigations on Extruder Design, International Plastics Engineering.